US010142977B2

United States Patent
Lee et al.

(10) Patent No.: US 10,142,977 B2
(45) Date of Patent: Nov. 27, 2018

(54) METHOD FOR RECEIVING DOWNLINK CONTROL CHANNEL IN WIRELESS COMMUNICATION SYSTEM APPLYING CARRIER AGGREGATION TECHNIQUE, AND APPARATUS THEREFOR

(71) Applicant: LG ELECTRONICS INC., Seoul (KR)

(72) Inventors: Seungmin Lee, Seoul (KR); Joonkui Ahn, Seoul (KR); Yunjung Yi, Seoul (KR); Inkwon Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/116,493

(22) PCT Filed: Mar. 11, 2015

(86) PCT No.: PCT/KR2015/002346
§ 371 (c)(1),
(2) Date: Aug. 3, 2016

(87) PCT Pub. No.: WO2015/137719
PCT Pub. Date: Sep. 17, 2015

(65) Prior Publication Data
US 2016/0360510 A1 Dec. 8, 2016

Related U.S. Application Data

(60) Provisional application No. 61/952,104, filed on Mar. 12, 2014.

(51) Int. Cl.
*H04W 72/04* (2009.01)
*H04L 5/00* (2006.01)
(Continued)

(52) U.S. Cl.
CPC ......... *H04W 72/042* (2013.01); *H04L 1/1822* (2013.01); *H04L 5/0053* (2013.01);
(Continued)

(58) Field of Classification Search
CPC .......... H04W 72/042; H04W 72/1289; H04W 76/048
See application file for complete search history.

(56) References Cited

U.S. PATENT DOCUMENTS

2010/0322173 A1 12/2010 Marinier et al.
2012/0281600 A1 11/2012 Tseng et al.
(Continued)

FOREIGN PATENT DOCUMENTS

CN 102804903 A 11/2012
EP 2919551 A1 9/2015
(Continued)

OTHER PUBLICATIONS

Nokia: "On TDD-FDD carrier aggregation", R1-134521, 3GPP TSG RAN WG1 Meeting #74bis, Guangzhou, China, Oct. 7-11, 2013.
(Continued)

*Primary Examiner* — Pao Sinkantarakorn
(74) *Attorney, Agent, or Firm* — Dentons US LLP

(57) ABSTRACT

Disclosed in the present application is a method for detecting a downlink control channel by a terminal in DRX mode in a wireless communication system applying carrier aggregation technique. Specifically, the method comprises the steps of: setting downlink control channel detection subframes in a TDD primary cell and an FDD secondary cell on the basis of a specific uplink/downlink sub-frame setting related to the TDD primary cell; detecting the downlink control channel in one of the downlink control channel detection sub-frames through the TDD primary cell or the FDD secondary cell while a preset DRX related timer defined by the number of sub-frames operates: and receiving a downlink data signal on the basis of the detected downlink control channel, wherein the downlink control channel detection sub-frames in the FDD secondary cell are sub-frames on the FDD secondary cell, conforming to the
(Continued)

location of downlink sub-frames in the specific uplink/downlink sub-frame setting or the location of special sub-frames including a downlink resource having the length identical to or greater than a preset length.

8 Claims, 10 Drawing Sheets

(51) Int. Cl.
*H04L 5/14* (2006.01)
*H04L 1/18* (2006.01)
*H04W 76/28* (2018.01)

(52) U.S. Cl.
CPC ....... *H04L 5/1469* (2013.01); *H04W 72/0413* (2013.01); *H04W 72/0446* (2013.01); *H04W 76/28* (2018.02)

(56) References Cited

U.S. PATENT DOCUMENTS

| | | | |
|---|---|---|---|
| 2013/0343239 A1 | 12/2013 | Damnjanovic et al. | |
| 2014/0029459 A1 | 1/2014 | Kwon et al. | |
| 2016/0294531 A1* | 10/2016 | Loehr | H04W 72/042 |
| 2017/0034808 A1* | 2/2017 | Ouchi | H04W 72/042 |

FOREIGN PATENT DOCUMENTS

| | | |
|---|---|---|
| KR | 1020140014544 A | 2/2014 |
| WO | 2013/137677 A1 | 9/2013 |
| WO | 2014007595 A1 | 1/2014 |

OTHER PUBLICATIONS

Huawei: "Standard impact of TDD-FDD CA for UEs not supporting simultaneous transmission and reception", R1-140032, 3GPP TSG RAN WG1 Meeting #76, Prague, Czech Republic, Feb. 10-14, 2014.

Catt: "DRX operation for TDD eIMTA", R1-140067, 3GPP TSG RAN WG1 Meeting #76, Prague, Czech Republic, Feb. 10-14, 2014.

Interdigital: "On signaling and fallback operation for TDD UL-DL reconfiguration", R1-133175, 3GPP TSG RAN WG1 Meeting #74, Barcelona, Spain, Aug. 19-23, 2013.

Asustek: "CSI reference subframe for half duplex TDD UE", R1-121041, 3GPP TSG RAN WG1 Meeting #72bis, Chicago, USA, Apr. 15-19, 2013.

* cited by examiner (a) Control-Plane Protocol Stack (b) User-Plane Protocol Stack

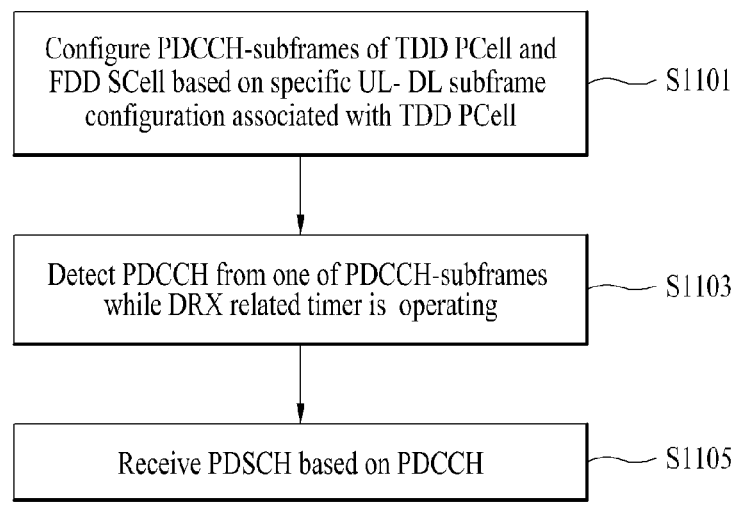
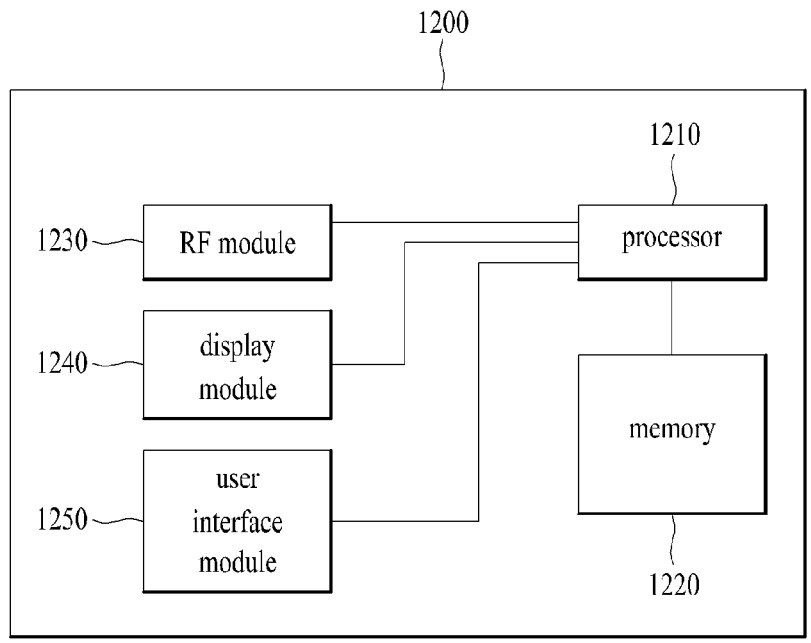

METHOD FOR RECEIVING DOWNLINK CONTROL CHANNEL IN WIRELESS COMMUNICATION SYSTEM APPLYING CARRIER AGGREGATION TECHNIQUE, AND APPARATUS THEREFOR

This application is a National Stage Application of International Application No. PCT/KR2015/002346, filed on Mar. 11, 2015, which claims the benefit of U.S. Provisional Application No. 61/952,104, filed on Mar 12, 2014, all of which are hereby incorporated by reference in their entirety for all purposes as if fully set forth herein.

TECHNICAL FIELD

The present invention relates to a wireless communication system, and more particularly, to a method of receiving a downlink control channel in a carrier aggregation applied wireless communication system and apparatus therefor.

BACKGROUND ART

3GPP LTE (3rd generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "3rd generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE OF THE INVENTION

Technical Task

Based on the above-mentioned discussions, the technical task of the present invention is to provide a method of receiving a downlink control channel in a carrier aggregation applied wireless communication system and apparatus therefor.

TECHNICAL SOLUTIONS

In one technical aspect of the present invention, provided herein is a method of detecting a downlink control signal by a user equipment in DRX (discontinuous reception) mode in a carrier aggregation applied wireless communication system, including configuring downlink control channel detection subframes in a TDD (time division duplex) primary cell and an FDD (frequency division duplex) secondary cell based on a specific uplink/downlink subframe configuration associated with the TDD primary cell, detecting the downlink control channel from one of the downlink control channel detection subframes through either the TDD primary cell or the FDD secondary cell while a preset DRX related timer defined by a subframe number unit is operating, and receiving a downlink data signal based on the detected downlink control channel, wherein the downlink control channel detection subframes in the FDD secondary cell comprise subframes on the FDD secondary cell and wherein the subframes on the FDD secondary cell match locations of downlink subframes on the specific uplink/downlink subframe configuration or locations of special subframes including a downlink resource over a preset length.

In this case, the preset DRX related timer may count only in subframes matching locations of downlink subframes on an uplink/downlink subframe configuration previously configured through a system information for the TDD primary cell or locations of special subframes including a downlink resource over a preset length.

Preferably, the user equipment may be incapable of simultaneous transmission and reception in the TDD primary cell and the FDD secondary cell.

In addition, the method may further include attempting a detection of an information on an uplink/downlink subframe configuration for a subframe usage dynamic change in the TDD primary cell. In this case, if the detection of the information on the uplink/downlink subframe configuration is not successful, the specific uplink/downlink subframe configuration may include an uplink/downlink subframe configuration having a maximum downlink subframe number among uplink/downlink subframe configurations assigned to the user equipment. Particularly, the uplink/ downlink subframe configuration having the maximum downlink subframe number may include an uplink/downlink subframe configuration assigned for a downlink HARQ (hybrid automatic repeat and request) operation in the TDD primary cell.

On the other hand, if the detection of the information on the uplink/downlink subframe configuration is successful, the specific uplink/downlink subframe configuration may include the detected uplink/downlink subframe configuration.

In another technical aspect of the present invention, provided herein is a user equipment operating in DRX (discontinuous reception) mode in a carrier aggregation applied wireless communication system, including a wireless communication module configured to transceive a signal with a network and a processor configured to process the signal, wherein the processor is further configured to configure downlink control channel detection subframes in a TDD (time division duplex) primary cell and an FDD (frequency division duplex) secondary cell based on a specific uplink/downlink subframe configuration associated with the TDD primary cell, detect the downlink control channel from one of the downlink control channel detection subframes through either the TDD primary cell or the FDD secondary cell while a preset DRX related timer defined by a subframe number unit is operating, and control the wireless communication module to receive a downlink data signal based on the detected downlink control channel, wherein the downlink control channel detection subframes in the FDD secondary cell comprise subframes on the FDD secondary cell, and wherein the subframes on the FDD secondary cell match locations of downlink subframes on the specific uplink/downlink subframe configuration or locations of special subframes including a downlink resource over a preset length.

Advantageous Effects

According to an embodiment of the present invention, a reference resource for channel state information measurement in a communication system in which usage of a radio resource is dynamically changeable can be defined more efficiently, whereby measurement of channel state information can be performed more stably.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

FIG. 11 is a flowchart for one example of receiving PDCCH according to an embodiment of the present invention.

FIG. 12 is a block diagram for configuration of a communication device according to one embodiment of the present invention.

BEST MODE FOR INVENTION

In the following description, compositions of the present invention, effects and other characteristics of the present invention can be easily understood by the embodiments of the present invention explained with reference to the accompanying drawings. Embodiments explained in the following description are examples of the technological features of the present invention applied to 3GPP system.

In this specification, the embodiments of the present invention are explained using an LTE system and an LTE-A system, which is exemplary only. The embodiments of the present invention are applicable to various communication systems corresponding to the above mentioned definition. In particular, although the embodiments of the present invention are described in the present specification on the basis of FDD, this is exemplary only. The embodiments of the present invention may be easily modified and applied to H-FDD or TDD.

Figure 1:
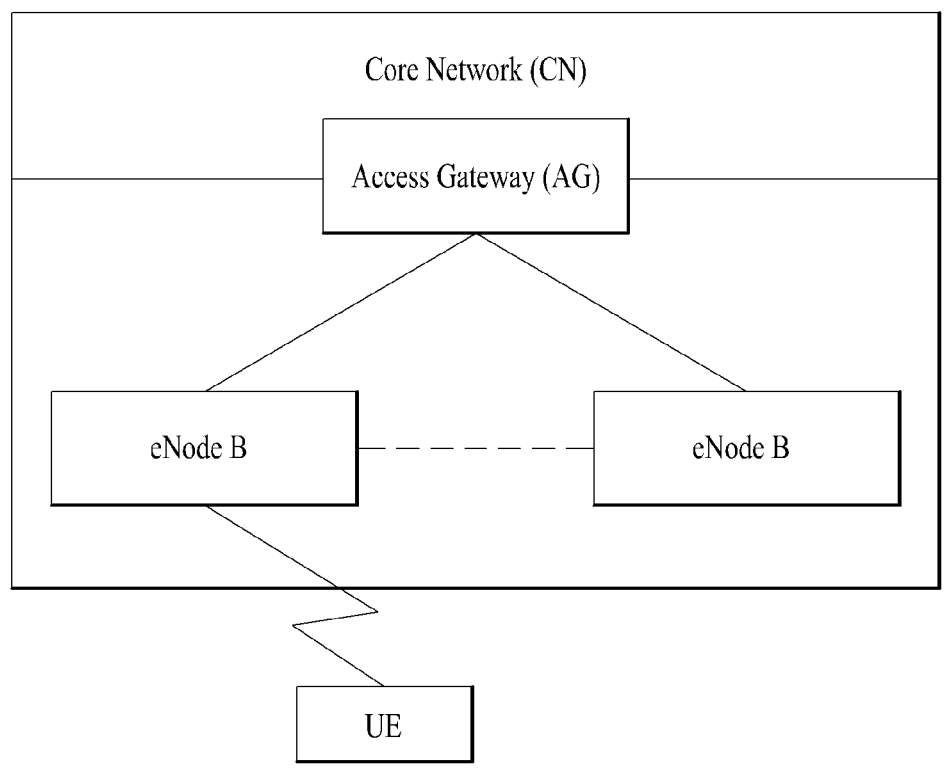
FIG. 1 is a schematic diagram of E-UMTS network structure as one example of a wireless communication system.
Figure 2:
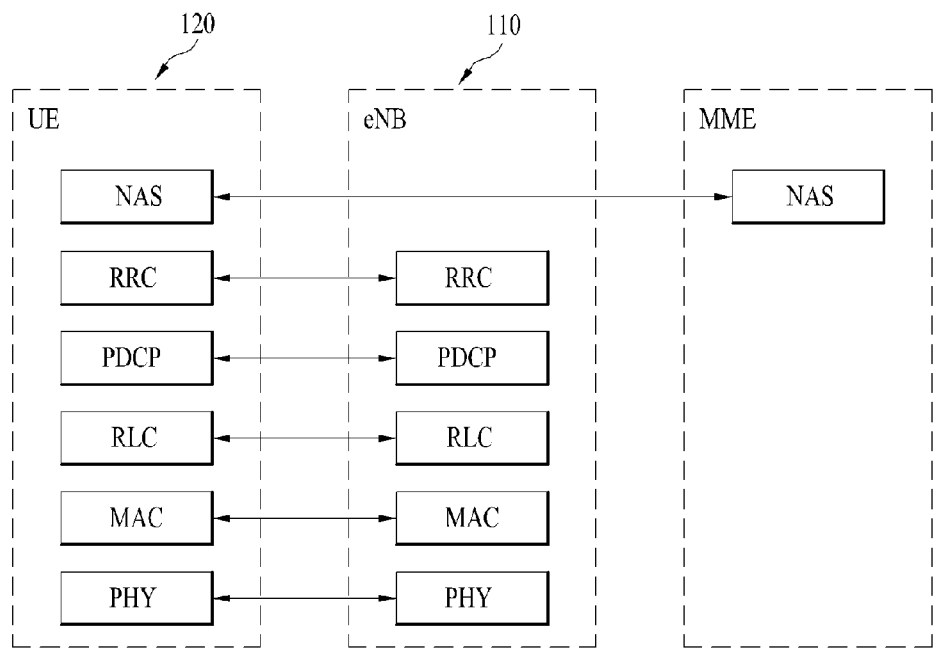
FIG. 2 is a diagram of structures of control and user planes of a radio interface protocol between a user equipment and E-UTRAN based on 3GPP radio access network specification.
Figure 2:
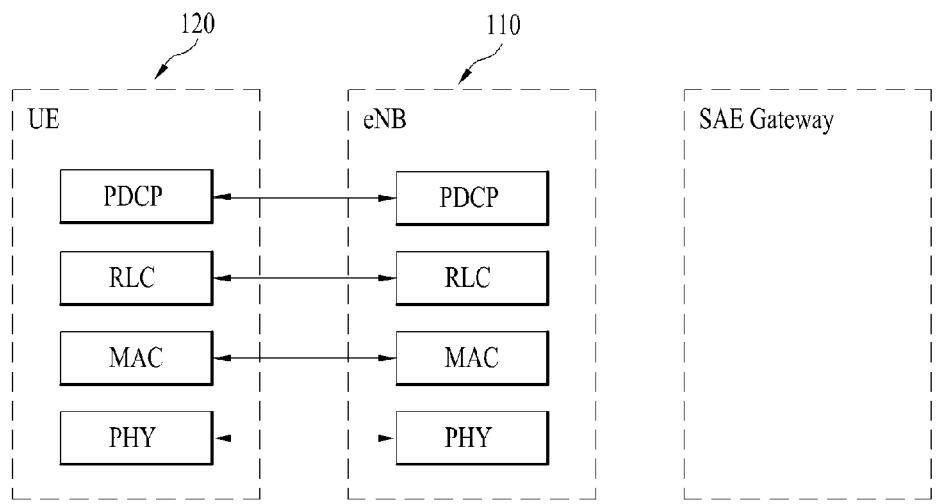

FIG. 2 is a diagram for structures of control and user planes of radio interface protocol between a 3GPP radio access network standard-based user equipment and E-UTRAN. The control plane means a path on which control messages used by a user equipment (UE) and a network to manage a call are transmitted. The user plane means a path on which such a data generated in an application layer as audio data, internet packet data, and the like are transmitted.

A physical layer, which is a 1st layer, provides higher layers with an information transfer service using a physical channel. The physical layer is connected to a medium access control layer situated above via a transport channel (trans antenna port channel). Data moves between the medium access control layer and the physical layer on the transport channel Data moves between a physical layer of a transmitting side and a physical layer of a receiving side on the physical channel. The physical channel utilizes time and frequency as radio resources. Specifically, the physical layer is modulated by OFDMA (orthogonal frequency division multiple access) scheme in DL and the physical layer is modulated by SC-FDMA (single carrier frequency division multiple access) scheme in UL.

Medium access control (hereinafter abbreviated MAC) layer of a 2nd layer provides a service to a radio link control (hereinafter abbreviated RLC) layer, which is a higher layer, on a logical channel. The RLC layer of the 2nd layer supports a reliable data transmission. The function of the RLC layer may be implemented by a function block within the MAC. PDCP (packet data convergence protocol) layer of the 2nd layer performs a header compression function to reduce unnecessary control information, thereby efficiently transmitting such IP packets as IPv4 packets and IPv6 packets in a narrow band of a radio interface.

Radio resource control (hereinafter abbreviated RRC) layer situated in the lowest location of a 3rd layer is defined on a control plane only. The RRC layer is responsible for control of logical channels, transport channels and physical channels in association with a configuration, a re-configuration and a release of radio bearers (hereinafter abbreviated RBs). The RB indicates a service provided by the 2nd layer for a data delivery between the user equipment and the network. To this end, the RRC layer of the user equipment and the RRC layer of the network exchange a RRC message with each other. In case that there is an RRC connection (RRC connected) between the user equipment and the RRC layer of the network, the user equipment lies in the state of RRC connected (connected mode). Otherwise, the user equipment lies in the state of RRC idle (idle mode). A non-access stratum (NAS) layer situated at the top of the RRC layer performs such a function as a session management, a mobility management and the like.

A single cell consisting of an eNode B is set to one of 1.25 MHz, 2.5 MHz, 5 MHz, 10 MHz, 15 MHz, and 20 MHz of bandwidths and then provides a downlink or uplink transmission service to a plurality of user equipments. Different cells can be configured to provide corresponding bandwidths, respectively.

DL transport channels for transmitting data from a network to a user equipment include a BCH (broadcast channel) for transmitting a system information, a PCH (paging channel) for transmitting a paging message, a downlink SCH (shared channel) for transmitting a user traffic or a control message and the like. DL multicast/broadcast service traffic or a control message may be transmitted on the DL SCH or a separate DL MCH (multicast channel). Meanwhile, UL transport channels for transmitting data from a user equipment to a network include a RACH (random access channel) for transmitting an initial control message, an uplink SCH (shared channel) for transmitting a user traffic or a control message. A logical channel, which is situated above a transport channel and mapped to the transport channel, includes a BCCH (broadcast channel), a PCCH (paging control channel), a CCCH (common control channel), a MCCH (multicast control channel), a MTCH (multicast traffic channel) and the like.

Figure 3:
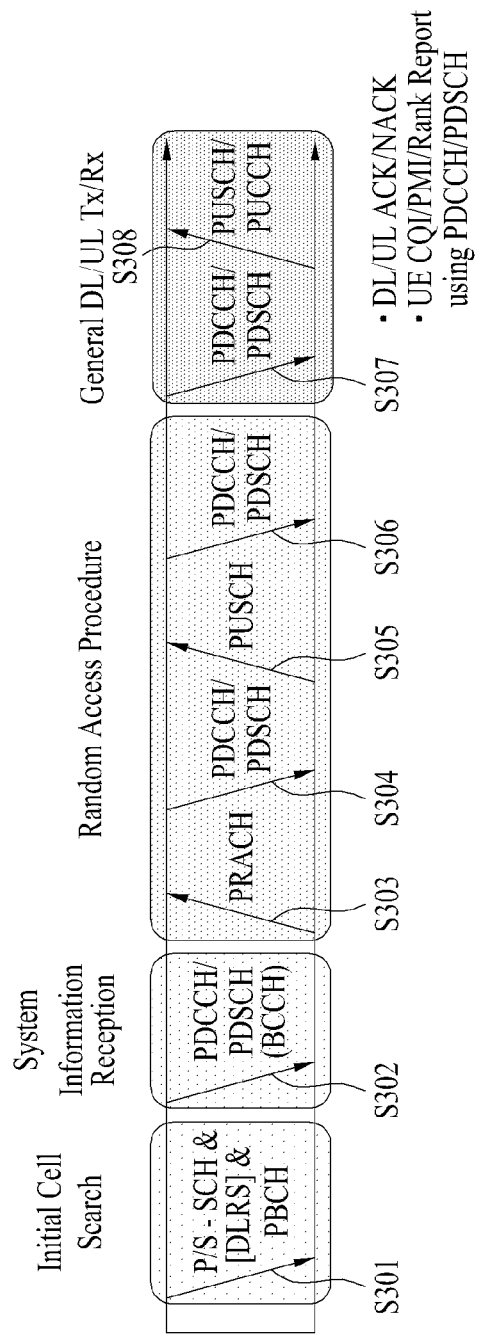
FIG. 3 is a diagram to describe physical channels used for 3GPP system and a general method of transmitting a signal using the physical channels.

FIG. 3 is a diagram for explaining physical channels used for 3GPP system and a general signal transmission method using the physical channels.

If a power of a user equipment is turned on or the user equipment enters a new cell, the user equipment may perform an initial cell search job for matching synchronization with an eNode B and the like [S301]. To this end, the user equipment may receive a primary synchronization channel (P-SCH) and a secondary synchronization channel (S-SCH) from the eNode B, may be synchronized with the eNode B and may then obtain information such as a cell ID and the like. Subsequently, the user equipment may receive a physical broadcast channel from the eNode B and may be then able to obtain intra-cell broadcast information. Meanwhile, the user equipment may receive a downlink reference signal (DL RS) in the initial cell search step and may be then able to check a DL channel state.

Having completed the initial cell search, the user equipment may receive a physical downlink shared control channel (PDSCH) according to a physical downlink control channel (PDCCH) and an information carried on the physical downlink control channel (PDCCH). The user equipment may be then able to obtain a detailed system information [S302].

Meanwhile, if a user equipment initially accesses an eNode B or does not have a radio resource for transmitting a signal, the user equipment may be able to perform a random access procedure to complete the access to the eNode B [S303 to S306]. To this end, the user equipment may transmit a specific sequence as a preamble on a physical random access channel (PRACH) [S303/S305] and may be then able to receive a response message on PDCCH and the corresponding PDSCH in response to the preamble [S304/S306]. In case of a contention based random access procedure (RACH), it may be able to additionally perform a contention resolution procedure.

Having performed the above mentioned procedures, the user equipment may be able to perform a PDCCH/PDSCH reception [S307] and a PUSCH/PUCCH (physical uplink shared channel/physical uplink control channel) transmission [S308] as a general uplink/downlink signal transmission procedure. In particular, the user equipment receives a DCI (downlink control information) on the PDCCH. In this case, the DCI contains such a control information as an information on resource allocation to the user equipment. The format of the DCI varies in accordance with its purpose.

Meanwhile, control information transmitted to an eNode B from a user equipment via UL or the control information received by the user equipment from the eNode B includes downlink/uplink ACK/NACK signals, CQI (Channel Quality Indicator), PMI (Precoding Matrix Index), RI (Rank Indicator) and the like. In case of 3GPP LTE system, the user equipment may be able to transmit the aforementioned control information such as CQI/PMI/RI and the like on PUSCH and/or PUCCH.

Figure 4:
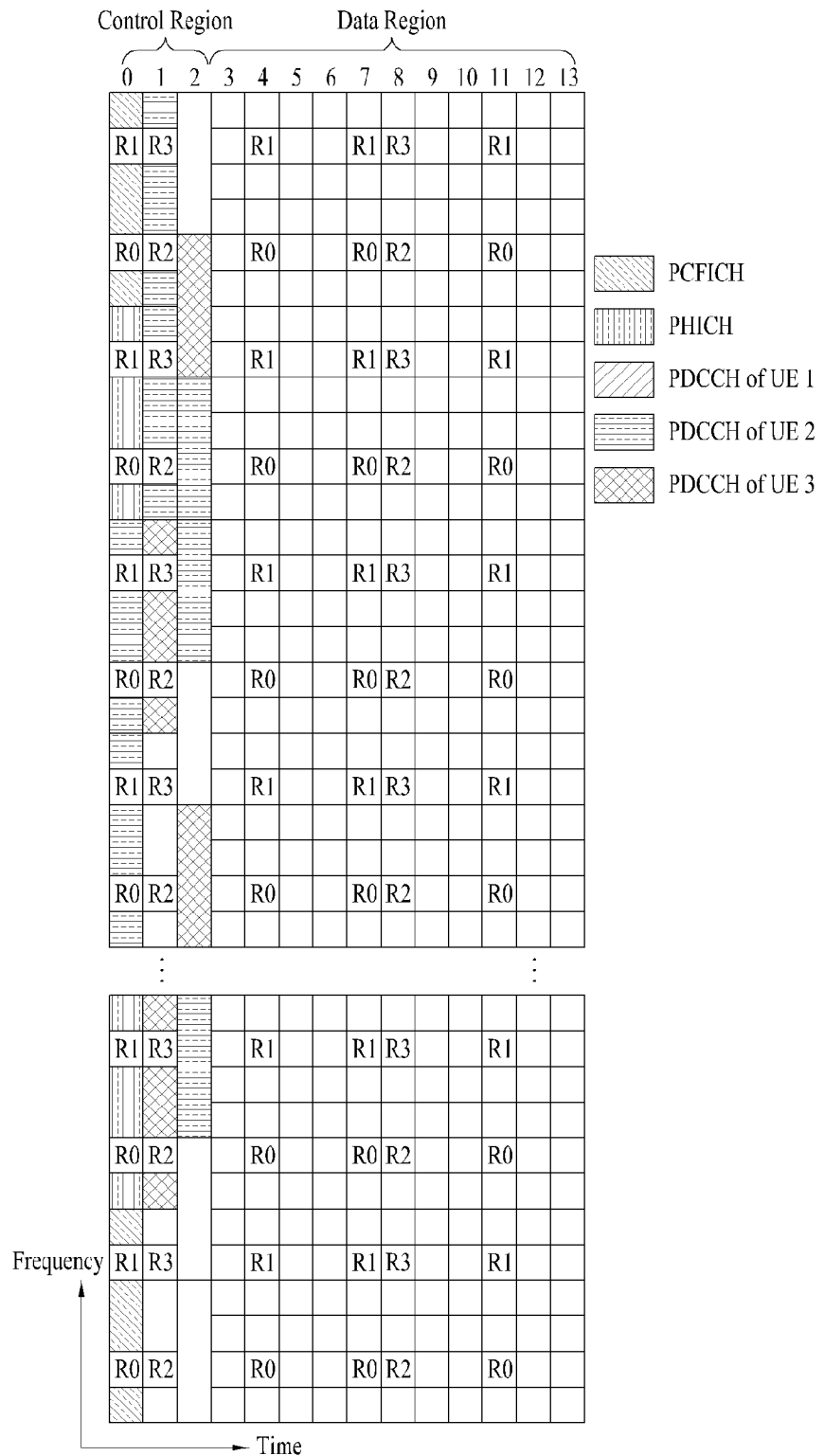
FIG. 4 is a diagram for one example of a structure of a downlink (DL) radio subframe used by LTE system.

FIG. 4 is a diagram for showing an example of a control channel included in a control region of a single subframe in a DL radio frame.

Referring to FIG. 4, a subframe consists of 14 OFDM symbols. According to a subframe configuration, the first 1 to 3 OFDM symbols are used for a control region and the other 13~11 OFDM symbols are used for a data region. In the diagram, R1 to R4 may indicate a reference signal (hereinafter abbreviated RS) or a pilot signal for an antenna 0 to 3. The RS is fixed as a constant pattern in the subframe irrespective of the control region and the data region. The control channel is assigned to a resource to which the RS is not assigned in the control region and a traffic channel is also assigned to a resource to which the RS is not assigned in the data region. The control channel assigned to the control region may include a physical control format indicator channel (PCFICH), a physical hybrid-ARQ indicator channel (PHICH), a physical downlink control channel (PDCCH), and the like.

The PCFICH (physical control format indicator channel) informs a user equipment of the number of OFDM symbols used for the PDCCH on every subframe. The PCFICH is situated at the first OFDM symbol and is configured prior to the PHICH and the PDCCH. The PCFICH consists of 4 resource element groups (REG) and each of the REGs is distributed in the control region based on a cell ID (cell identity). One REG consists of 4 resource elements (RE). The RE may indicate a minimum physical resource defined as 'one subcarrier×one OFDM symbol'. The value of the PCFICH may indicate the value of 1 to 3 or 2 to 4 according to a bandwidth and is modulated into a QPSK (quadrature phase shift keying).

The PHICH (physical HARQ (hybrid-automatic repeat and request) indicator channel) is used for carrying HARQ ACK/NACK for an UL transmission. In particular, the PHICH indicates a channel to which DL ACK/NACK information is transmitted for UL HARQ. The PHICH consists of a single REG and is scrambled cell-specifically. The ACK/NACK is indicated by 1 bit and modulated into BPSK (binary phase shift keying). The modulated ACK/NACK is spread into a spread factor (SF) 2 or 4. A plurality of PHICHs, which are mapped to a same resource, composes a PHICH group. The number of PHICH, which is multiplexed by the PHICH group, is determined according to the number of spreading code. The PHICH (group) is repeated three times to obtain diversity gain in a frequency domain and/or a time domain.

The PDCCH (physical DL control channel) is assigned to the first n OFDM symbol of a subframe. In this case, the n is an integer more than 1 and indicated by the PCFICH. The PDCCH consists of at least one CCE. The PDCCH informs each of user equipments or a user equipment group of an information on a resource assignment of PCH (paging channel) and DL-SCH (downlink-shared channel), which are transmission channels, an uplink scheduling grant, HARQ information and the like. The PCH (paging channel) and the DL-SCH (downlink-shared channel) are transmitted on the PDSCH. Hence, an eNode B and the user equipment transmit and receive data via the PDSCH in general except a specific control information or a specific service data.

Information on a user equipment (one or a plurality of user equipments) receiving data of PDSCH, a method of receiving and decoding the PDSCH data performed by the user equipment, and the like is transmitted in a manner of being included in the PDCCH. For instance, assume that a specific PDCCH is CRC masked with an RNTI (radio network temporary identity) called "A" and an information on data transmitted using a radio resource (e.g., frequency position) called "B" and a DCI format i.e., a transmission form information (e.g., a transport block size, a modulation scheme, coding information, and the like) called "C" is transmitted via a specific subframe. In this case, the user equipment in a cell monitors the PDCCH using the RNTI information of its own, if there exist at least one or more user equipments having the "A" RNTI, the user equipments receive the PDCCH and the PDSCH, which is indicated by the "B" and the "C", via the received information on the PDCCH.

Figure 5:
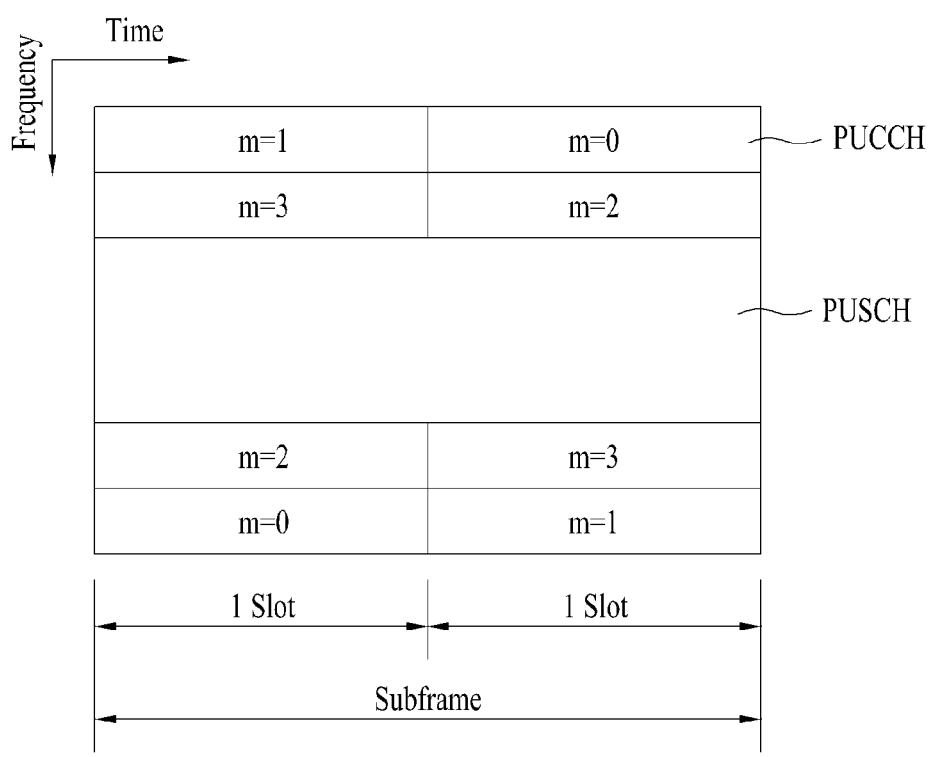
FIG. 5 is a diagram for one example of a structure of an uplink (UL) subframe used by LTE system.

FIG. 5 is a diagram for a structure of an uplink radio frame in LTE system.

Referring to FIG. 5, an UL subframe can be divided into a region to which a physical uplink control channel (PUCCH) carrying control information is assigned and a region to which a physical uplink shared channel (PUSCH) carrying a user data is assigned. A middle part of the subframe is assigned to the PUSCH and both sides of a data region are assigned to the PUCCH in a frequency domain. The control information transmitted on the PUCCH includes an ACK/NACK used for HARQ, a CQI (channel quality indicator) indicating a DL channel status, an RI (rank indicator) for MIMO, an SR (scheduling request) corresponding to an UL resource allocation request, and the like. The PUCCH for a single UE uses one resource block, which occupies a frequency different from each other in each slot within a subframe. In particular, 2 resource blocks assigned to the PUCCH are frequency hopped on a slot boundary. In particular, FIG. 5 shows an example that the PUCCHs satisfying conditions (e.g., m=0, 1, 2, 3) are assigned to a subframe.

And, time for transmitting a sounding reference signal in a subframe corresponds to a section at which a symbol located at the very last in a time axis is located and the sounding reference signal is transmitted via a data transmission band in frequency axis. Sounding reference signals of a plurality of user equipments, which are transmitted via the last symbol of an identical subframe, can be distinguished from each other according to a frequency position.

Figure 6:
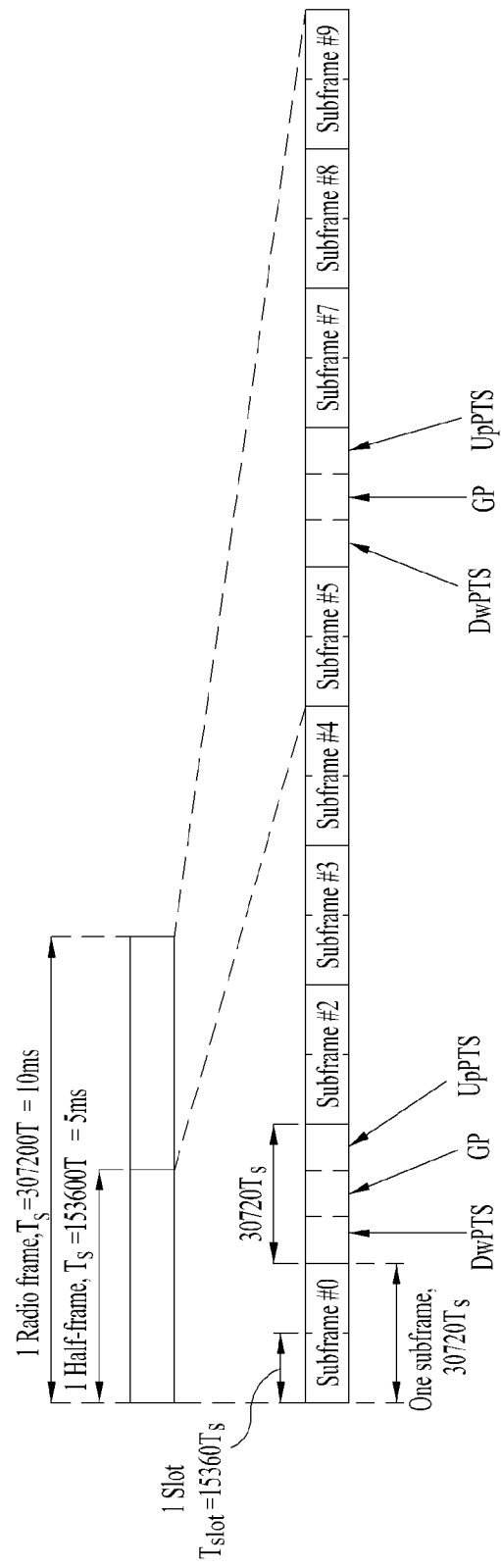
FIG. 6 is a diagram for one example of a radio frame in LTE TDD system.

FIG. 6 is a diagram for an example of a structure of a radio frame in LTE TDD system. In LTE TDD system, a radio frame includes two half frames. Each of the half frames includes 4 normal subframes including 2 slots, respectively and a special subframe including DwPTS (downlink pilot time slot), GP (guard period) and UpPTS (uplink pilot time slot).

Among the special subframe, the DwPTS is used for initial cell search in a user equipment, synchronization or channel estimation. The UpPTS is used for channel estimation in a base station and uplink transmission synchronization of the user equipment. In particular, the DwPTS is used for DL transmission and the UpPTS is used for UL transmission. In particular, the UpPTS is utilized to transmit a PRACH preamble or an SRS. The guard period is a period for eliminating interference generated in uplink due to multi-path delay of a downlink signal between uplink and downlink.

Meanwhile, Table 1 in the following shows uplink/downlink subframe configuration in LTE TDD system.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, D, U, and S indicate a downlink subframe, an uplink subframe, and a special subframe, respectively. And, Table 1 also shows a downlink-uplink switching period in uplink/downlink subframe configuration of each system.

Table 2 to Table 4 shows HARQ timeline of the uplink/downlink subframe configuration shown in Table 1. Table 2 shows a set of indexes of subframes in which PDSCH is transmitted. In this case, the PDSCH corresponds to HARQ transmitted in a specific uplink subframe. For example, in case of uplink/downlink subframe configuration #1, HARQ-ACK is transmitted in a subframe #2 in response to PDSCH which is received in a subframe #5 and a subframe #6.

TABLE 2

| UL/DL Configuration | 0 | 1 | 2 | 3 | 4 | 5 | 6 | 7 | 8 | 9 |
|---|---|---|---|---|---|---|---|---|---|---|
| 0 | D | S | U 6 | U | U 0 | D | S | U 1 | U | U 5 |
| 1 | D | S | U 5, 6 | U 9 | D | D | S | U 0, 1 | U 4 | D |
| 2 | D | S | U 4, 5, 6, 8 | D | D | D | S | U 0, 1, 3, 9 | D | D |
| 3 | D | S | U 1, 5, 6 | U 7, 8 | U 0, 9 | D | D | D | D | D |
| 4 | D | S | U 0, 1, 4, 5 | U 6, 7, 8, 9 | D | D | D | D | D | D |
| 5 | D | S | U 0, 2, 3, 4, 5, 6, 7, 8, 9 | D | D | D | D | D | D | D |
| 6 | D | S | U 5 | U 6 | U 9 | D | S | U 0 | U 1 | D |

Table 3 shows indexes of subframes in which an uplink grant is transmitted. The uplink grant is scheduled by PUSCH transmitted in a specific uplink subframe. For example, in case of an uplink/downlink subframe configuration #1, PUSCH transmitted in a subframe #2 is scheduled by an uplink grant transmitted in a subframe #6. In particular, uplink/downlink subframe configuration #0 of Table 3 corresponds to a special case that the number of downlink subframes is less than the number of uplink subframes. In this case, it is able to schedule PUSCH for two uplink subframes in a single downlink subframe. It is able to indicate PUSCH of a subframe among two subframes using a UL index field of DCI (downlink control information). In particular, an indicator of the uplink index can indicate whether or not an index put in parenthesis is used, whether or not an index not put in parenthesis is used, or whether or not PUSCH is scheduled in two subframes.

TABLE 3

| UL/DL Configuration | 0 | 1 | 2 | 3 | 4 | 5 | 6 | 7 | 8 | 9 |
|---|---|---|---|---|---|---|---|---|---|---|
| 0 | D | S | U 6, (5) | U (6) | U 0 | D | S | U 1, (0) | U (1) | U 5 |
| 1 | D | S | U 6 | U 9 | D | D | S | U 1 | U 4 | D |
| 2 | D | S | U 8 | D | D | D | S | U 3 | D | D |
| 3 | D | S | U 8 | U 9 | U 0 | D | D | D | D | D |
| 4 | D | S | U 8 | U 9 | D | D | D | D | D | D |
| 5 | D | S | U 8 | D | D | D | D | D | D | D |
| 6 | D | S | U 5 | U 6 | U 9 | D | S | U 0 | U 1 | D |

Table 4 shows an index of a subframe in which PHICH is transmitted when PUSCH is transmitted in a specific uplink subframe. For example, in case of an uplink/downlink subframe configuration #1, PHICH is received in a subframe #6 in response to PUSCH transmitted in a subframe #2.

TABLE 4

| UL/DL Configuration | 0 | 1 | 2 | 3 | 4 | 5 | 6 | 7 | 8 | 9 |
|---|---|---|---|---|---|---|---|---|---|---|
| 0 | D | S | U 6 | U 0 | U 0 | D | S | U 1 | U 5 | U 5 |
| 1 | D | S | U 6 | U 9 | D | D | S | U 1 | U 4 | D |
| 2 | D | S | U 8 | D | D | D | S | U 3 | D | D |
| 3 | D | S | U 8 | U 9 | U 0 | D | D | D | D | D |
| 4 | D | S | U 8 | U 9 | D | D | D | D | D | D |
| 5 | D | S | U 8 | D | D | D | D | D | D | D |
| 6 | D | S | U 6 | U 9 | U 0 | D | S | U 1 | U 5 | D |

Figure 7:
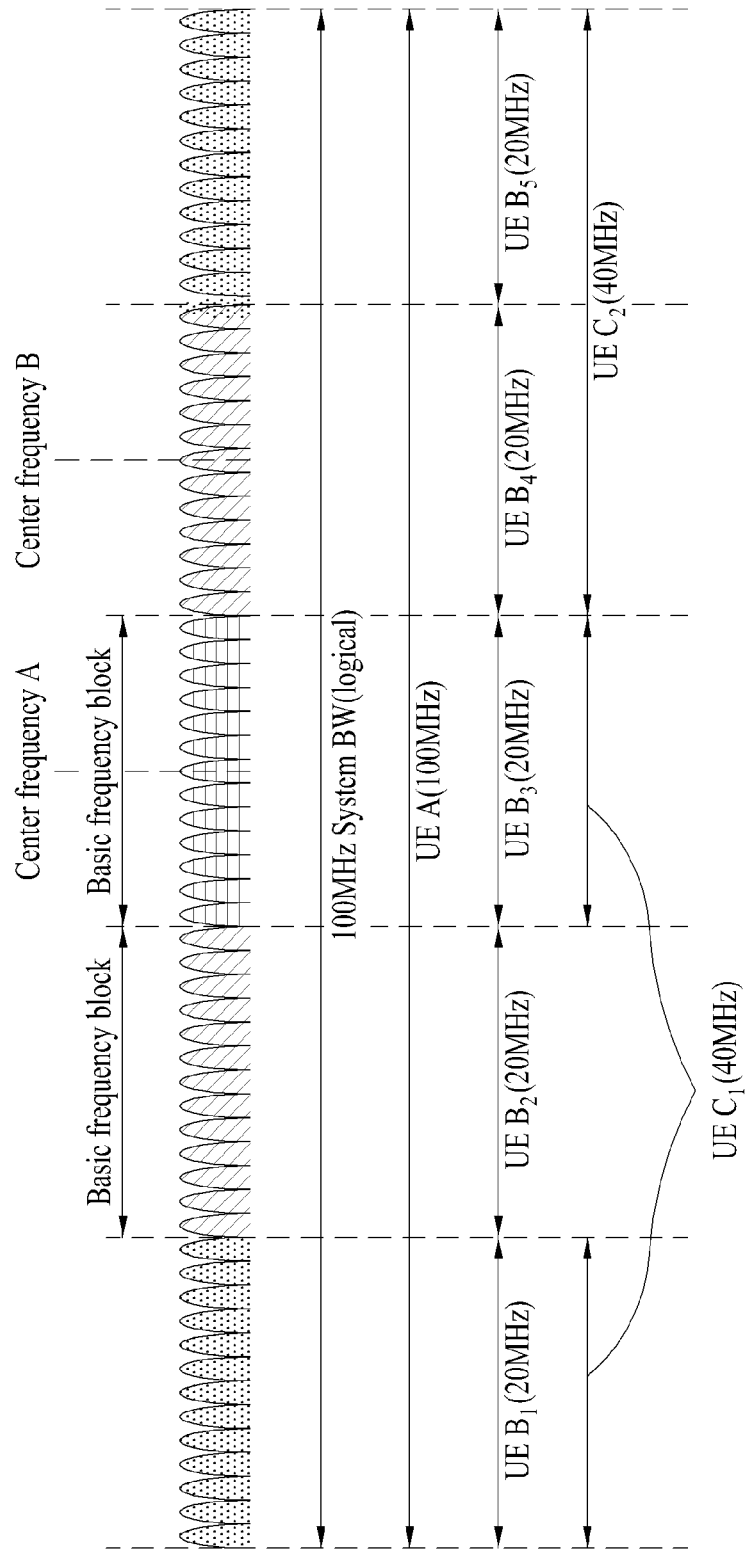
FIG. 7 is a diagram for a concept to describe a carrier aggregation (CA) scheme.

In the following description, a carrier aggregation scheme is explained. FIG. 7 is a diagram for explaining a concept of a carrier aggregation scheme.

A carrier aggregation means a technology using one big logical frequency band in a manner that a user equipment uses a frequency block configured with an uplink resource (or a component carrier) and/or a downlink resource (or a component carrier) or a plurality of cells (of logical meaning) in order for a wireless communication system to use a wider frequency band. For clarity, a terminology of 'component carrier' is consistently used in the following description.

Referring to FIG. 7, a total system bandwidth (system BW) may have a system bandwidth up to maximum 100 MHz as a logical bandwidth. The total system bandwidth includes five component carriers and each of the component carriers may have up to maximum 20 MHz. The component carrier includes at least one physically contiguous subcarrier. Although each of the component carriers in FIG. 7 is depicted as including an identical bandwidth, this is exemplary only. Each of the component carriers may be able to have a bandwidth different from each other. And, although each of the component carriers is depicted as it is adjacent to each other in frequency domain, since the diagram is depicted in terms of a logical concept, each of the component carriers may be physically adjacent to each other or may be apart from each other.

A center frequency can be differently used for each of the component carriers or a common center frequency can be used for the component carriers physically adjacent to each other. As an example, in FIG. 7, if assumed that all component carriers are physically adjacent to each other, a center frequency 'A' can be used. Or, if assumed that each of the component carriers is not physically adjacent to each other, such a separate center frequency as a center frequency 'A', a center frequency 'B' or the like can be used for each of the component carriers.

In the present specification, a component carrier may correspond to a system bandwidth of a legacy system. By defining the component carrier on the basis of the legacy system, it may become easy to provide backward compatibility and to design a system in a radio communication environment in which an evolved UE and a legacy UE coexist. As an example, in case that LTE-A system supports a carrier aggregation, each of the component carriers may correspond to a system bandwidth of LTE system. In this case, the component carrier may have a prescribed bandwidth among the bandwidths of 1.25 MHz, 2.5 MHz, 5 MHz, 10 MHz, or 20 MHz.

In case that a total system bandwidth is expanded by a carrier aggregation, a frequency band used for communicating with each UE is defined by a component carrier unit. A UE A may use 100 MHz corresponding to the total system bandwidth and performs a communication in a manner of using all of the five component carriers. A UE $B_1$~$B_5$ can use a bandwidth of 20 MHz only and performs a communication by using one component carrier. A UE $C_1$ and a UE $C_2$ can use a bandwidth of 40 MHz and performs a communication by using two component carriers, respectively. The two component carriers may or may not be logically/physically adjacent to each other. The UE $C_1$ indicates a case that the UE $C_1$ uses two component carriers not adjacent to each other and the UE $C_2$ indicates a case that the UE $C_2$ uses two component carriers adjacent to each other.

LTE system uses one DL component carrier and one UL component carrier. On the other hand, LTE-A system may use a plurality of component carriers as depicted in FIG. 6. In this case, a scheme of scheduling a data channel, which is scheduled by a control channel, can be divided into a conventional linked carrier scheduling scheme and a cross carrier scheduling scheme.

More specifically, in case of the linked carrier scheduling scheme, similar to a legacy LTE system using a single component carrier, a control channel transmitted on a specific component carrier schedules a data channel only via the specific component carrier.

Meanwhile, in case of the cross carrier scheduling scheme, a control channel transmitted on a primary component carrier (primary CC) schedules a data channel transmitted on the primary component carrier or a different component carrier using a carrier indicator field (hereinafter abbreviated CIF).

Meanwhile, in case of applying the carrier aggregation technique in a legacy LTE-A system, when an identical frame structure type (i.e., one of FDD and TDD) and a TDD cell are aggregated, a case of configuring an identical UL-DL subframe configuration is considered only. Yet, in a recent LTE-A system, carrier aggregation is permitted to a case that UL-DL subframe configurations different from each other are configured or a case that frame structure types different from each other are applied. However, in this case, it may not be able to use scheduling timing, ACK/NACK feedback timing, retransmission timing and the like defined by a UL-DL subframe configuration as it is in each cell.

In particular, when a TDD Pcell and a FDD Scell are aggregated with each other, if ACK/NACK is transmitted via a UL subframe of the TDD Pcell in a manner that HARQ timing defined in a legacy FDD cell is applied to ACK/NACK timing transmitted in UL as it is in response to PDSCH transmitted via the FDD Scell, it is unable to transmit the ACK/NACK if the TDD Pcell is defined by a DL subframe at the ACK/NACK transmission timing. Hence, in order to provide ACK/NACK transmission to more DL subframes of the FDD Scell, it may be able to apply new HARQ timing instead of the legacy HARQ timing defined in the FDD Scell.

As a method of applying the new HARQ timing, when ACK/NACK is transmitted via the Pcell in a carrier aggregation situation of the TDD Pcell and the FDD Scell, it may be able to apply one of HARQ timings capable of being applied to a legacy TDD cell as HARQ timing of the FDD Scell. In this case, an UL-DL subframe configuration capable of applying the HARQ timing for the FDD Scell can be mainly determined by two schemes including (1) and (2) described in the following.

(1) As the HARQ timing for the FDD Scell, it may be able to apply HARQ timing of a UL-DL subframe configuration in which an UL subframe is defined by a subset of a subframe defined as a UL subframe in a UL-DL subframe configuration designated in the TDD Pcell.

For example, when the TDD Pcell is configured by a UL-DL subframe configuration #3, the HARQ timing capable of being applied to the FDD Scell becomes a UL-DL subframe configuration #3, #4, and #5. In particular, subframes except the subframe #2, #3 and #4 defined as UL subframes in the UL-DL subframe configuration #3 are unable to be applied to UL-DL subframe configuration #0, #1, #2 and #6 defined as UL subframes. By doing so, ACK/NACK transmission timing is defined only when the Pcell corresponds to a UL subframe.

(2) As the HARQ timing for the FDD Scell, it may be able to define that any HARQ timing defined in a UL-DL subframe configuration can be applied as the HARQ timing for the FDD Scell irrespective of a UL-DL subframe configuration of the TDD Pcell. In this case, since it is unable to practically transmit ACK/NACK feedback defined to be transmitted in a subframe, which is not defined as UL in the TDD Pcell, it is necessary to put a limit in a manner that PDCCH/PDSCH requiring ACK/NACK feedback is not scheduled in a DL subframe of the FDD Scell corresponding to the subframe, transmission and reception are performed without retransmitting HARQ, and the like.

In the HARQ timing scheme (1) or (2), if UL-DL subframe configuration of the TDD Pcell corresponds to #0, although a subframe #3 and a subframe #8 are defined as UL subframes in a single operation of the TDD Pcell, the subframes are not used for transmitting ACK/NACK. Hence, a resource for transmitting ACK/NACK is not defined for the subframe #3 and the #8 or a power control command may not be applied to ACK/NACK PUCCH transmitted via the subframe #3 and the #8. Hence, in the HARQ timing scheme (1) or (2), if UL-DL subframe configuration of the TDD Pcell corresponds to the UL-DL subframe configuration #0, although the subframe #3 and the #8 are designated as ACK/HARQ feedback timing at HARQ timing applied to the FDD Scell, it is preferable not to transmit ACK/NACK feedback in the subframe #3 and the #8. In this case, a UE may not receive DL-SCH carrying PDSCH requiring ACK/NACK feedback or PDCCH for scheduling the PDSCH in a DL subframe configured to receive ACK/NACK feedback in the subframe #3 and the #8. Or, the UE does not perform a HARQ operation carrying physical layer ACK/NACK in the subframe and receives PDSCH. In particular, in case of the HARQ timing scheme (1), if UL-DL subframe configuration of the TDD Pcell corresponds to #0, a UL-DL subframe configuration capable of applying HARQ timing to the FDD Scell can be restricted to UL-DL subframe #0, #2, and #5. In particular, the UL-DL subframe configuration capable of applying HARQ timing to the FDD Scell can be restricted to UL-DL subframe configuration in which ACK/NACK transmission is not designated by a subframe #3 and #8.

Meanwhile, when an eNB performs a duplex operation by dividing all available resources into a downlink resource and an uplink resource, a discussion on a technology of more flexibly changing an operation of selecting a usage of each resource from among a downlink resource and a uplink resource is in progress in a recent wireless communication system.

The dynamic resource usage change has a merit in that optimized resource distribution can be performed all the time in a situation that a size of DL traffic and a size of UL traffic are dynamically changing. For example, when a FDD system is managed in a manner of dividing a frequency band into a downlink band and an uplink band, an eNB can indicate whether a specific band corresponds to a downlink resource or an uplink resource via RRC, MAC layer, or a physical layer signal at specific timing to dynamically change a resource usage.

In particular, a TDD system divides all subframes into an uplink subframe and a downlink subframe and uses the uplink subframe and the downlink subframe for uplink transmission of a UE and downlink transmission of an eNB, respectively. In general, the resource division can be given as a part of system information according to the UL/DL subframe configuration shown in Table 1. Of course, a new UL/DL subframe configuration can be additionally provided as well as the UL/DL subframe configuration shown in Table 1. In the TDD system, an eNB can indicate whether a specific subframe corresponds to a downlink resource or an uplink resource via RRC layer, MAC layer, or a physical layer signal at specific timing to dynamically change a resource usage. In particular, a usage change message can be referred to as a reconfiguration message. The reconfiguration message can be signaled via RRC layer, MAC layer or a physical layer signal in a predefined cell (e.g., Pcell). And, the usage change message may have a UE-specific property, a cell-specific property, or a UE-group-specific property (or a UE-group-common property). In addition, the usage change message can be transmitted via a USS (UE-specific search space) or a CSS (common search space) in a predefined cell.

In a legacy LTE system, a downlink resource and an uplink resource are designated via system information. Since the system information is transmitted to a plurality of unspecified UEs, if the system information is dynamically changed, a problem may occur in operations of legacy UEs. Hence, it is preferable to deliver information on a dynamic resource usage change to UEs currently maintaining a connection with an eNB via new signaling, i.e., UE-specific signaling instead of the system information. The new signaling may indicate a configuration of a dynamically changed resource, e.g., UL/DL subframe configuration information different from information indicated by the system information in a TDD system.

In addition, the new signaling can include information related to HARQ. In particular, if a scheduling message, PUSCH/PUSCH transmission timing corresponding to the scheduling message and HARQ timing defined by HARQ-ACK transmission timing in response to the PUSCH/PUSCH transmission timing are dynamically changed, in order to solve a problem that HARQ timing is not continuous between timing changes, the new signaling can include HARQ timing configuration information capable of maintaining stable HARQ timing in case that a resource configuration is dynamically changed. In case of a TDD system, the HARQ timing configuration information can be configured by UL/DL subframe configuration, which is referred when DL HARQ timing and/or UL HARQ timing is defined.

According to the foregoing description, having accessed a system in which a resource usage is dynamically changing, a UE receives various informations on a resource configuration. In particular, in case of a TDD system, a UE can receive information described in the following at specific timing.

1) System information (UL/DL subframe configuration indicated by SIB1 (system information block type 1)) (hereinafter, SIB1 UL/DL subframe configuration).

Yet, in case of Scell, the UL/DL subframe configuration is provided via RRC signaling (specifically, RadioResourceConfigCommonSCell IE) instead of the system information. For clarity, the RRC signaling is also referred to as the SIB1 UL/DL subframe configuration in the following.

2) UL/DL subframe configuration (hereinafter, actual UL/DL subframe configuration or valid UL/DL configuration) delivered to indicate usage of each subframe via separate signaling 3) DL HARQ timing, i.e., UL/DL subframe configuration (hereinafter, DL HARQ reference subframe configuration) delivered to define timing of transmitting HARQ-ACK in response to PDSCH received at specific timing 4) UL HARQ timing, i.e., UL/DL subframe configuration (hereinafter, UL HARQ reference subframe configuration) delivered to define timing of transmitting PUSCH in response to UL grant received at specific timing and timing of receiving PHICH in response to PUSCH transmitted at specific timing.

If a specific UE accesses an eNB dynamically changing a usage of a resource, the eNB may designate UL/DL subframe configuration in which many UL subframes are included via the system information. This is because there is a restriction on dynamically changing a subframe configured as a DL subframe to an UL subframe in the SIB1 UL/DL subframe configuration. For example, since legacy UEs always expects and measures transmission of a CRS in a subframe designated as a DL subframe via the SIB 1 DL/UL subframe configuration, if the subframe is dynamically changed into an UL subframe, a huge error may occur in measuring a CRS by the legacy UEs. Hence, while the eNB configures many UL subframes in the SIB1 UL/DL subframe configuration, if DL traffic increases, it is preferable to dynamically change a part of the DL subframes into a DL subframe via the actual UL/DL subframe configuration.

In a TDD system operating based on the aforementioned principle, although a UL/DL subframe configuration #0 is indicated to a UE via the SIB1 UL/DL subframe configuration at specific timing, a UL/DL subframe configuration #1 can be indicated to the UE via the actual UL/DL subframe configuration.

And, the DL HARQ reference subframe configuration, which is a reference for DL HARQ timing, may correspond to a UL/DL subframe configuration #2. This is because, if a UL/DL subframe configuration including less UL subframe and many DL subframes becomes a reference of DL HARQ timing, a situation that it is difficult to transmit HARQ-ACK is made due to the maximum DL subframes, and the DL HARQ timing is managed according to the situation, it is able to maintain the HARQ timing although the UL/DL subframe is dynamically changed. Similarly, the UL HARQ reference subframe configuration, which is a reference for UL HARD timing, may become such a UL/DL subframe configuration including many UL subframes as a UL/DL subframe configuration #0.

Figure 8:
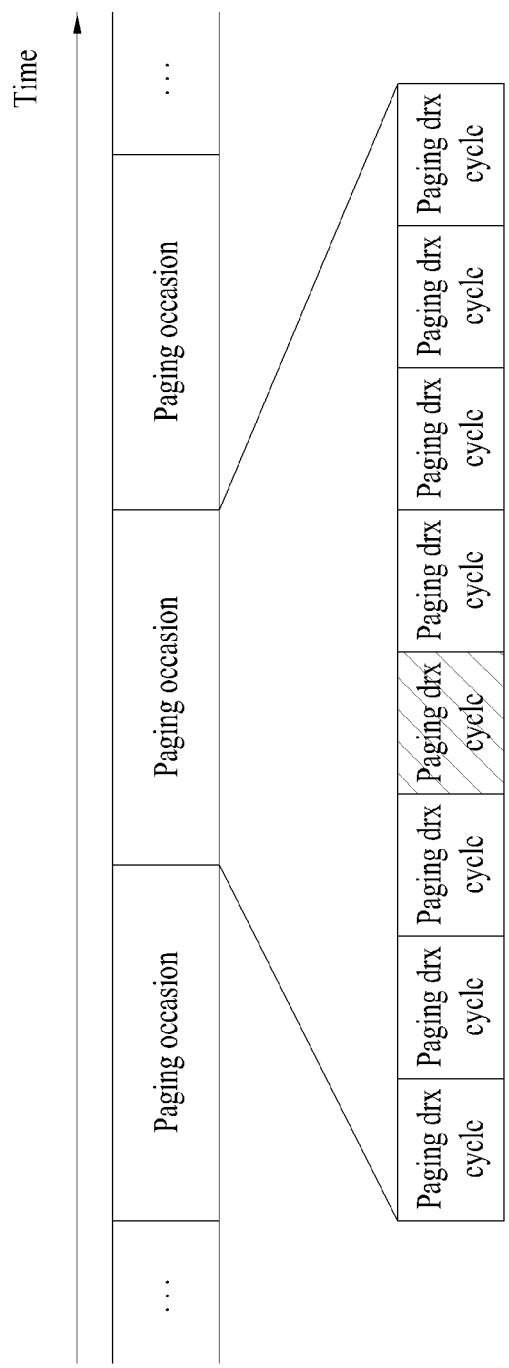
FIG. 8 is a diagram to describe a general transceiving method using a paging message.

FIG. 8 is a diagram to describe a general transceiving method using a paging message.

Referring to FIG. 8, a paging message includes a paging record configured with a paging cause, a UE identity and the like. When the paging message is received, a user equipment (UE) can perform discontinuous reception (DRX) cycle for the purpose of power consumption reduction.

In particular, a network configures several paging opportunity times (i.e., paging occasions (PO)) for each time periodicity called DRX cycle. Specific UE can obtain a paging message by receiving a specific paging occasion only. The UE does not receive a paging channel for time except the specific paging occasion and may stay in sleep state to reduce power consumption. One paging occasion amounts to one TTI.

A base station and UE may use a paging indicator (PI) with a specific value indicating a transmission of a paging message. The base station can inform the UE of a paging information transmission by defining a specific identity (e.g., paging-radio network temporary identity (P-RNTI)) for the usage of PI. For instance, a UE wakes up each DRX cycle and receives one subframe to obtain a presence or non-presence of appearance of a paging message. If P-RNTI exists in L1/L2 control channel (PDCCH) of the received subframe, the UE can be aware that a paging message exists in PDSCH of the corresponding subframe. Moreover, it UE identity (e.g., IMSI) of the UE exists in the paging message, the UE makes a response (e.g., RRC connection, system information reception) to the base station and then receives a service.

In the following description, DRX (discontinuous reception) is described. DRX is a method of reducing power consumption by receiving PDCCH discontinuously.

Figure 9:
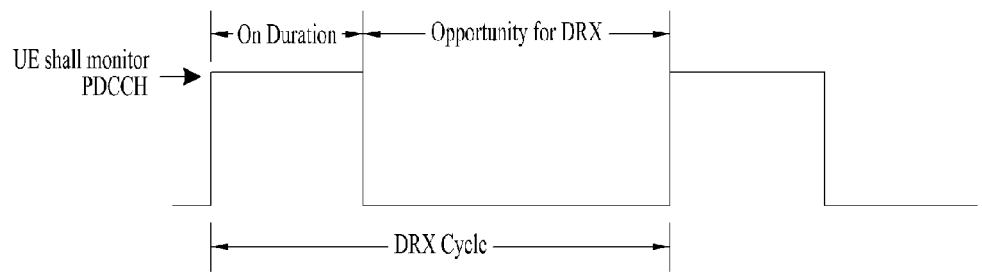
FIG. 9 is a diagram for the concept of DRX.

FIG. 9 is a diagram for the concept of DRX.

Referring to FIG. 9, if DRX is configured, a UE in RRC-CONNECTED state attempts reception of PDCCH corresponding to DL channel, i.e., performs PDCCH monitoring in a determined time interval only and does not perform the PDCCH monitoring in the rest of time intervals. In doing so, a time interval in which the UE should perform PDCCH monitoring is called 'On Duration', and 'On Duration' is defined once for each DRX cycle. In particular, DRX cycle means repetitive periodicity of On Duration.

A UE should perform PDCCH monitoring in On Duration within one DRX cycle, and the DRX cycle determines that On Duration appears by specific periodicity. DRX cycle is classified into a long DRX cycle and a short DRX cycle. The long DRX cycle is characterized in minimizing battery consumption of the UE, whereas the short DRX cycle is characterized in minimizing data transmission delay.

If a UE receives PDCCH in On Duration within DRX cycle, additional transmission or retransmission may occur in time interval other than On Duration. Hence, PDCCH monitoring should be performed in time interval as well as in On Duration. In particular, the UE should perform PDCCH monitoring in a time interval, in which a timer drx-InactivityTimer for managing inactivity or a timer drx-RetransmissionTimer for managing retransmission is operating, as well as in a time interval in which a timer onDurationTimer for managing On Duration is operating. In this case, the timers are defined by the number of subframes. And, the timer expires by counting the number of subframes, which meets the definition of the corresponding timer, until reaching a timer value.

Besides, if a UE is performing random access or attempts GL Grant reception after sending a scheduling request, the UE should perform PDCCH monitoring as well.

Thus, a time interval in which a UE should perform PDCCH monitoring is called Active Time. And, the Active Time is configured with On Duration for performing PDCCH monitoring periodically and a time interval for performing PDCCH monitoring in case of event occurrence. In particular, Active Time is defined as: (1) a time in which onDurationTimer, drx-InactivityTimer, drx-RetransmissionTimer, or mac-ContentionResolutionTimer is operating; (2) a time in which Scheduling Request process is performed; (3) a time in which UL grant for retransmission of data can be transmitted if the retransmission data exists in HARQ buffer; (4) a time taken until receiving C-RNTI or T-C-RNTI indicating allocation of radio resource indicating new (initial) transmission of data since reception of RACH MSG 2 (RAR), or the like.

Figure 10:
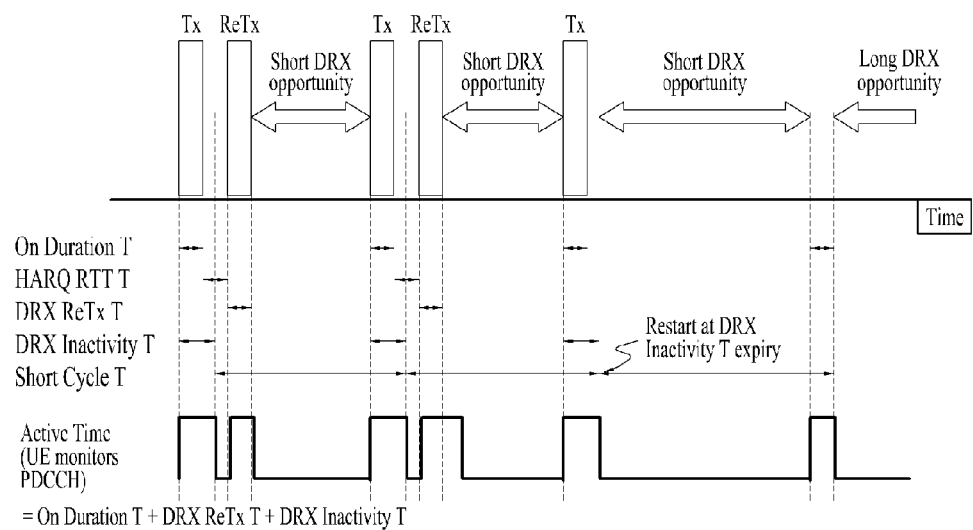
FIG. 10 is a diagram for one example of DRX operation in LTE system.

FIG. 10 is a diagram for one example of DRX operation in LTE system. Referring to FIG. 10, it can be observed that a UE taking DRX operation performs the corresponding operation each TTI (i.e., each subframe) as follows.

First of all, if HARQ RTT (Round Trip Time) timer expires in this subframe and data of a corresponding HARQ buffer is not successfully decoded, drx-RetransmissionTimer for the HARQ buffer is initiated.

Moreover, if DRX Command MAC CE (Control Element) is received, a UE stops onDurationTimer and drx-InactivityTimer.

Moreover, when Inactivity Timer expires or DRX Command MAC CE is received, if short DRX cycle is set, drxShortCycleTimer is initiated or resumed and the short DRX cycle is used. Otherwise (i.e., if short DRX cycle is not set), long DRX cycle is used. If drxShortCycleTimer expires, long DRX cycle is used.

If the remainder after dividing [(SFN*10)+subframe number] by a short DRX cycle value is equal to DRX Start Offset value in case of using the short DRX cycle or the remainder after dividing [(SFN*10)+subframe number] by a long DRX cycle value is equal to DRX Start Offset value in case of using long DRX cycle, onDurationTimer is initiated.

A UE monitors PDCCH in PDCCH-subframe during Active Time. In a subframe in which DL assignment information is received on PDCCH or DL assignment was already performed like SPS, HARQ RTT timer for the corresponding HARQ process is initiated and drx-RetransmissionTimer for the corresponding HARQ process is stopped. If PDCCH indicates a new transmission, drx-InactivityTimer is initiated or resumed.

In this case, PDCCH-subframe means a subframe having PDCCH or a subframe having a configured and not-suspended R-PDCCH for RN (relay node). For FDD UE behavior, PDCCH-subframe can be represented as a random subframe. For TDD UE behavior, PDCCH-subframe can represent a DL subframe and a subframe including DwPTS only.

In the aforementioned DRX process, only HARQ RTT Timer is fixed to 8 ms and other Timer values, i.e., onDurationTimer, drx-InactivityTimer, drx-RetransmissionTimer, mac-ContentionResolutionTimer and the like are set for a UE by eNB through RRC signal. And, long DRX cycle, short DRX cycle and the like, each of which indicates periodicity of DRX cycle, are set by the eNB through RRC signal as well.

In a carrier aggregation (CA) applied situation, if a radio resource usage on a specific cell is dynamically changed (hereinafter, such a cell shall be named eIMTA cell), the present invention proposes a method of efficiently defining a subframe for a UE operating in DRX mode to actually perform PDCCH monitoring (or blind detection). In this case, PDCCH may include EPDCCH (Enhanced PDCCH) transmittable through PDSCH region.

If a UE fails to successfully receive a usage change message (i.e., reconfiguration message) related to a cell (i.e., eIMTA cell) to which dynamic change of radio resource usage is applied, rules can be defined as Table 5 so that the UE performs channel (CSI) measurement operation, DL control channel (PDCCH) monitoring operation, DL data channel (PDSCH) reception operation, UL data channel (PUSCH) transmission operation and/or the like based on SIB1 UL/DL subframe configuration on the corresponding cell.

Such an operation of a UE can be named fallback operation or fallback mode. Through this, it is able to minimize influence, which is caused by interference generated from malfunction (e.g., wrong UL data channel/UL control channel (PUSCH/PUCCH) transmission due to control channel false detection) of a UE failing to receive a reconfiguration message successfully to a communication between another UE and a base station or a communication between legacy UE and base station), or DL HARQ buffer management error of a UE failing to receive a reconfiguration message successfully.

Moreover, when cells having different UL/DL configurations are used by carrier aggregation and a UE is unable to perform simultaneous reception (RX) and transmission (TX) operation on the corresponding cells, as shown in Table 6 in the following, the current 3GPP standard document defines that the UE performs Transmission/reception operation of UL/DL signal based on prescribed constrains and also performs valid subframe determination used for channel state information measurement.

TABLE 5

CSI Measurement Operation

When a UE decodes explicit L1 signaling of reconfiguration correctly and detects a valid UL-DL configuration, the UE shall measure CSI only within the subframes indicated as DL subframe or special subframe by the explicit L1 signaling of reconfiguration.
If UE does not detect L1 signaling conveying a valid UL-DL configuration for a radio frame, the UE shall measure CSI only within the subframes indicated as DL subframe or special subframe by SIB configuration.
PDCCH (and/or PDSCH) Monitoring (or Reception) Operation If UE detects L1 signaling conveying a valid UL-DL configuration for a radio frame,
    UE shall monitor the non-DRX DL subframes or special subframes indicated by
    explicit L1 signaling.
If UE does not detect L1 signaling conveying a valid UL-DL configuration for a radio frame,
    UE shall monitor the non-DRX DL subframes or special subframes for PDCCH or
    EPDCCH as indicated by SIB-1 configuration.
Valid UL-DL Configuration Determination DL HARQ reference configuration can choose from Rel-8 TDD UL-DL configurations {2, 4, 5}.
For UE configured with TDD eIMTA, uplink scheduling timing and HARQ timing follow UL-DL configuration signaled in SIB1.
For valid UL & DL reference configurations:
    The set of UL subframes of the DL HARQ reference configuration should be a subset
    of the UL subframes of the UL HARQ reference UL/DL configuration.
For validity of UL/DL configuration in a reconfiguration DCI under any valid UL & DL HARQ reference configurations:
    The UE should not expect any subframe configured as UL subframe or special
    subframe in DL HARQ reference configuration is dynamically used as a DL
    subframe.
    The UE should not expect any subframe configured as DL subframe or special
    subframe in UL HARQ reference configuration is dynamically used as a UL
    subframe.
UL Grant Validation Under fallback, if the UE receives a UL grant corresponding to at least one UL subframe per SIB1 not in the set of UL subframes per DL HARQ reference configuration, the UE still treats it as a valid grant.
Under fallback, if the UE receives a NAK in PHICH triggering PUSCH transmission in a UL subframe per SIB1 not in the set of UL subframes per DL HARQ reference configuration, the UE transmits PUSCH.
SRS Transmission Validation For type 1 SRS, the determination of the subframe where the type 1 SRS is due for transmission when triggered is based on SIB1.
For both type 0 and type 1 SRS, SRS transmissions can be configured in a UL subframe or UpPTS based on SIB1.
    If a UE detects L1 signaling conveying a valid UL-DL configuration for radio
    frame(s), and if the UL subframe or UpPTS for SRS transmission is changed to DL
    subframe, the UE shall drop the SRS transmission.
    If a UE does not detect L1 signaling conveying a valid UL-DL configuration for radio
    frame(s),
The UE still transmits the type 1 SRS in uplink subframes and special subframes indicated based on SIB1, but the UE shall drop the type 0 SRS transmission in a subframe not indicated as UL subframe or UpPTS by the DL-HARQ reference configuration if there is no PUSCH transmission in the same subframe.

TABLE 6

In case multiple cells with different uplink-downlink configurations are aggregated and
the UE is not capable of simultaneous reception and transmission in the aggregated cells,
the following constraints apply:
    If the subframe in the primary cell is a downlink subframe, the UE shall not
    transmit any signal or channel on a secondary cell in the same subframe
    If the subframe in the primary cell is an uplink subframe, the UE is not expected
    to receive any downlink transmissions on a secondary cell in the same subframe
    If the subframe in the primary cell is a special subframe and the same subframe in
    a secondary cell is a downlink subframe, the UE is not expected to receive
    PDSCH/EPDCCH/PMCH/PRS transmissions in the secondary cell in the same
    subframe, and the UE is not expected to receive any other signals on the
    secondary cell in OFDM symbols that overlaps with the guard period or UpPTS in
    the primary cell.
A downlink subframe in a serving cell shall be considered to be valid if:
    it is configured as a downlink subframe for that UE, and
    in case multiple cells with different uplink-downlink configurations are
    aggregated and the UE is not capable of simultaneous reception and transmission
    in the aggregated cells, the subframe in the primary cell is a downlink subframe or
    a special subframe with the length of DwPTS more than $7680 \cdot T_s$, and
    except for transmission mode 9 or 10, it is not an MBSFN subframe, and
    it does not contain a DwPTS field in case the length of DwPTS is $7680 \cdot T_s$ and
    less, and
    it does not fall within a configured measurement gap for that UE, and
    for periodic CSI reporting, it is an element of the CSI subframe set linked to the
    periodic CSI report when that UE is configured with CSI subframe sets, and
for a UE configured in transmission mode 10 with multiple configured CSI processes, and
aperiodic CSI reporting for a CSI process, it is an element of the CSI subframe set linked
to the downlink subframe with the corresponding CSI request in an uplink DCI format,
when that UE is configured with CSI subframe sets for the CSI process.

Additionally, in the current 3GPP standard document, a method for a UE operating in DRX mode to perform DRX timer counting on an eIMTA cell and a method of assuming subframes usable for PDCCH (or EPDDCH) monitoring (or, blind detection) are defined as Table 7.

TABLE 7

DRX and PDCCH Monitoring for eIMTA

UE is not required to monitor eIMTA command when not in active time.
For DRX timer counting, UE shall follow SIB1 UL/DL configuration.
For PDCCH monitoring, UE shall follow L1 UL/DL configuration
indicated by eIMTA command related to this radio frame if the
UE receives eIMTA command.

TABLE 7-continued

DRX and PDCCH Monitoring for eIMTA

When the UE has not detected eIMTA command, the UE shall follow
SIB1 UL/DL configuration for both DRX Timer counting and
PDCCH monitoring.

Moreover, in the current 3GPP standard document, PDCCH-subframe assumed by a UE incapable of performing simultaneous transmission/reception (TX and RX) operation on CA applied cells and assumption for subframes in which the corresponding UE actually performs (E)PCCCH monitoring (or blind detection) during Active Time are defined as Table 8 in the following.

TABLE 8

PDCCH-subframe
    Refers to a subframe with PDCCH. For FDD UE operation, this represents any subframe; for
    TDD UE operation, if UE is capable of simultaneous reception and transmission in the
    aggregated cells, this represents the union of downlink subframes and subframes including
    DwPTS of all serving cells, except serving cells that are configured with schedulingCellId;
    otherwise, this represents the subframes where the PCell is configured as a downlink
    subframe or a subframe including DwPTS. For RNs with an RN subframe configuration
    configured and not suspended, in its communication with the E-UTRAN, this represents all
    downlink subframes configured for RN communication with the E-UTRAN.
When a DRX cycle is configured, the Active Time includes the time while:
    onDurationTimer or drx-InactivityTimer or drx-RetransmissionTimer or mac-
    ContentionResolutionTimer is running; or
    a Scheduling Request is sent on PUCCH and is pending; or
    an uplink grant for a pending HARQ retransmission can occur and there is data in the
    corresponding HARQ buffer; or
    a PDCCH indicating a new transmission addressed to the C-RNTI of the UE has not been
    received after successful reception of a Random Access Response for the preamble not
    selected by the UE.
When DRX is configured, the UE shall for each subframe:
    during the Active Time, for a PDCCH-subframe, if the subframe is not required for uplink
    transmission for half-duplex FDD UE operation and if the subframe is not part of a
    configured measurement gap:
        monitor the PDCCH;
        if the PDCCH indicates a DL transmission or if a DL assignment has been configured
        for this subframe:

TABLE 8-continued start the HARQ RTT Timer for the corresponding HARQ process;
    stop the drx-RetransmissionTimer for the corresponding HARQ process.
if the PDCCH indicates a new transmission (DL or UL):
start or restart drx-InactivityTimer.

In the following, in carrier aggregation (CA) applied situation, if radio resource usage on a specific cell is dynamically changed (i.e., named eIMTA cell) according to a burden state and a UE is unable to perform simultaneous TX and RX operation on the corresponding cells, a method of efficiently defining a subframe in which the corresponding UE operating in DRX mode actually performs PDCCH monitoring is described. For clarity of the description, although a situation of using two cells by CA is assumed, it is apparent that this method can be extended and applied to a situation that three or more cells are used by CA.

In case that TDD PCell and FDD SCell (i.e., FDD UL CC and FDD DL CC) are used by CA, a UE operating in DRX mode can assume subframes for actually performing PDCCH monitoring on the basis of the proposed rules in the following. Particularly, according to the present invention, assumed is a case of using TDD eIMTA PCell and FDD SCell by CA.

1) First of all, although TDD eIMTA PCell is operated in fallback mode (i.e., by applying SIB1 UL/DL subframe configuration), it is preferable that DRX operation related specific timers (e.g., onDurationTimer, drx-InactivityTimer, drx-RetransmissionTimer, etc.) are counted in consideration of DL subframe and special subframe on SIB1 UL-DL subframe configuration of TDD eIMTA PCell.

2) When TDD eIMTA PCell is operating in fallback mode, subframes for a corresponding UE to actually perform PDCCH monitoring can be assumed as subframes corresponding to DL subframe and special subframe on DL HARQ reference subframe configuration of TDD eIMTA PCell. The reason for this is that DL HARQ reference subframe configuration is the configuration having the greatest number of DL subframes that can be assigned to the corresponding UE. Yet, it is preferable that subframes corresponding to measurement gap are excluded.

When the corresponding UE operates TDD eIMTA PCell in fallback mode (i.e., by applying SIB1 UL/DL subframe configuration), such a rule can alleviate the problems that may be caused because UL/DL subframe configurations assumed on TDD eIMTA PCell by the base station and the corresponding UE are changed.

For example of such a problem, there is a case that UL/DL subframe configurations assumed on TDD eIMTA PCell by the base station and the corresponding UE are different. If so, the number/position of subframes actually used for PDCCH monitoring assumed in an active interval by the base station and the corresponding UE may be changed. Hence, in viewpoint of the base station, after the base station has transmitted scheduling information for initial transmission on the assumption of a subframe for the corresponding UE to actually perform PDCCH monitoring, the corresponding UE is regarded as starting the counting of drx-InactivityTimer. Yet, since the corresponding UE does not define the subframe as PDCCH monitoring performed subframe, the UE fails to receive the scheduling information for the initial transmission but may not perform the counting of drx-InactivityTimer. Moreover, the UE is unable to receive all control/data informations transmitted by the corresponding base station on the assumption that the drx-InactivityTimer of the UE has not expired.

3) When TDD eIMTA PCell is operating in fallback mode, subframes for a corresponding UE to actually perform PDCCH monitoring can be assumed as subframes corresponding to DL subframe and special subframe on DL HARQ reference subframe configuration of TDD eIMTA PCell. Of course, it is preferable that subframes corresponding to measurement gap are excluded.

4) Moreover, if TDD eIMTA PCell is operated in non-fallback mode (i.e., by applying actual UL-DL subframe configuration or valid UL-DL subframe configuration), subframes for a corresponding UE to actually perform PDCCH monitoring can be assumed as subframes corresponding to DL subframe and special subframe on actual UL-DL subframe configuration or valid UL-DL subframe configuration of TDD eIMTA PCell. Likewise, it is preferable that subframes corresponding to measurement gap are excluded.

The above rules 1) to 4) can be extended and applied to a situation of using TDD eIMTA PCell and TDD (eIMTA/Non-eIMTA) SCell are used by CA as well as to a case of using TDD eIMTA PCell and FDD SCell by CA.

Yet, in case that TDD eIMTA PCell and TDD (eIMTA/Non-eIMTA) SCell are carrier aggregated, it is preferable that this case is limitedly applied to the case a) or the case b) in the following.

a) Case that a set of DL subframes and/or special subframes on TDD eIMTA PCell related SIB1 UL-DL subframe configuration (and/or DL HARQ reference subframe configuration and/or UL HARQ reference subframe configuration and/or UL reference HARQ timeline and/or DL reference HARQ timeline) includes a set of DL subframes and/or special subframes on TDD eIMTA SCell related RadioResourceConfigCommonScell based UL-DL subframe configuration (and/or DL HARQ reference subframe configuration and/or UL HARQ reference subframe configuration and/or UL reference HARQ timeline and/or DL reference HARQ timeline).

b) Case that a set of DL subframes and/or special subframes on TDD eIMTA PCell related SIB1 UL-DL subframe configuration (and/or DL HARQ reference subframe configuration and/or UL HARQ reference subframe configuration and/or UL reference HARQ timeline and/or DL reference HARQ timeline) includes a set of DL subframes and/or special subframes on TDD Non-eIMTA SCell related RadioResourceConfigCommonScell based UL-DL subframe configuration (and/or DL HARQ reference subframe configuration and/or UL HARQ reference subframe configuration and/or UL reference HARQ timeline and/or DL reference HARQ timeline).

FIG. 11 is a flowchart for one example of receiving PDCCH according to an embodiment of the present invention. Particularly, FIG. 11 shows one example of operation of a UE incapable of simultaneous transmission and reception in TDD PCell and FDD SCell.

Referring to FIG. 11, like a step S1101, a UE configures PDCCH-subframes of TDD PCell and FDD SCell based on specific UL/DL subframe configuration associated with TDD PCell. In particular, the PDCCH-subframes may configured with subframes in TDD PCell and FDD SCell, which match locations of UL/DL subframes on the specific UL/DL subframe configuration or locations of special subframes including DL resources over a preset length.

Subsequently, like a step S1103, while the DRX related timer is operating, the UE attempts the PDCCH detection in one of the PDCCH-subframes. In doing so, the DRX related timer counts by subframe units, and preferably, in the subframes of the TDD PCell and the FDD SCell, which match locations of DL subframes on SIB1 UL/DL subframe configuration of the TDD PCell or locations of special subframes including DL resource over a preset length, among the PDCCH-subframes only. Finally, like a step S1105, the UE receives PDSCH based on the detected PDCCH.

A rule can be defined in a manner that the proposed schemes mentioned in the foregoing description are limitedly applied to a case that a radio resource usage of at least one specific cell is dynamically changed in accordance with a burden state in a carrier aggregation applied situation (and/or a case that a transmission mode of at least one specific cell is designated as a predefined transmission mode and/or a case that a UL/DL configuration of at least one specific cell (e.g., TDD eIMTA cell) is (re)configured into a specific value) only.

Moreover, an information on the aforementioned embodiments, an information on a presence or non-presence of application of the corresponding embodiments and the like can be notified to the user equipment by the base station through a predefined signal (e.g., a physical layer signal or a higher layer signal). A rule can be defined in a manner that the aforementioned embodiments are limitedly applied to a case of using TDD Cell and FDD Cell by carrier aggregation (e.g., TDD (eIMTA/Non-eIMTA) PCell and FDD SCell) only.

In a CA applied situation, in viewpoint of a UE unable to perform simultaneous transmission/reception (Simultaneous TX and RX) operation on aggregated cells, the aforementioned proposed schemes may be limitedly applied to a case that a use of subframes on PCell is prioritized higher than that on SCell only. Additionally, the aforementioned proposed schemes may be limitedly applied to user equipments unable to perform the simultaneous transmission/reception operation on CA applied cells only. Additionally, a rule can be defined so that the present invention is limitedly applied to a case that a DwPTS region of a special subframe on PCell (or SCell) is greater than (or, greater than or equal to) $7680-T_s$ only.

Moreover, according to the aforementioned embodiments, a rule can be defined so that [when TDD (eIMTA/Non-eIMTA) PCell and FDD SCell (and/or TDD (eIMTA/Non-eIMTA) SCell) is used by carrier aggregation, if the TDD (eIMTA/Non-eIMTA) PCell and the FDD SCell (and/or TDD (eIMTA/Non-eIMTA) SCell) are a special subframe and a DL subframe at a specific timing, respectively] a UE unable to perform the simultaneous transmission/reception operation on the corresponding cells can assume that a CRS transmission is performed on a region corresponding to a DwPTS region on a special subframe of the TDD (eIMTA/Non-eIMTA) PCell in a DL subframe region on the FDD SCell (and/or TDD (eIMTA/Non-eIMTA) SCell) only.

FIG. 12 is a block diagram for configuration of a communication device according to one embodiment of the present invention.

Referring to FIG. 12, a communication device 1200 includes a processor 1210, a memory 1220, an RF module 1230, a display module 1240 and a user interface module 1250.

The communication device 1200 is illustrated for clarity and convenience of the description and some modules can be omitted. Moreover, the communication device 1200 may further include at least one necessary module. And, some modules of the communication device 1200 can be further divided into sub-modules. The processor 1210 is configured to perform operations according to the embodiment of the present invention exemplarily described with reference to the accompanying drawings. In particular, the detailed operations of the processor 1210 can refer to the contents described with reference to FIGS. 1 to 11.

The memory 1220 is connected to the processor 1210 and stores operating systems, applications, program codes, data and the like. The RF module 1230 is connected to the processor 1210 and performs a function of converting a baseband signal into a radio signal or converting a radio signal into a baseband signal. To this end, the RF module 1230 performs analog conversion, amplification, filtering and frequency uplink transform or inverse processes thereof. The display module 1240 is connected to the processor 1210 and displays various kinds of informations. The display module 1240 can include such well-known elements as LCD (Liquid Crystal Display), LED (Light Emitting Diode), OLED (Organic Light Emitting Diode) and the like, by which the present invention is non-limited. The user interface module 1250 is connected to the processor 1210 and can include a combination of well-known interfaces such as a keypad, a touchscreen and the like.

The above-described embodiments correspond to combination of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. It is apparent that an embodiment can be configured by combining claims, which are not explicitly cited in-between, together without departing from the spirit and scope of the appended claims or that the combined claims can be included as new claims by revision after filing an application.

Embodiments of the present invention can be implemented using various means. For instance, embodiments of the present invention can be implemented using hardware, firmware, software and/or any combinations thereof. In case of the implementation by hardware, a method according to one embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

A method of receiving a downlink control channel in a carrier aggregation applied wireless communication system and apparatus therefor, as mentioned in the foregoing description, are described centering on an example applied to 3GPP LTE system, and may be further applicable to various kinds of mobile communication systems as well as to the 3GPP LTE system.

What is claimed is:

1. A method of detecting a downlink control channel by a user equipment in DRX (discontinuous reception) mode in a carrier aggregation applied wireless communication system, comprising:
configuring downlink control channel detection subframes in a secondary cell based on a specific uplink/downlink subframe configuration for a TDD (time division duplex) primary cell;
detecting the downlink control channel from the downlink control channel detection subframes when a preset DRX related timer defined by a subframe number unit is operating; and
receiving a downlink data channel based on the detected downlink control channel,
wherein the downlink control channel detection subframes comprise subframes on the secondary cell matching locations of downlink subframes on the specific uplink/downlink subframe configuration or locations of special subframes including a downlink resource over a preset length,
wherein the specific uplink/downlink subframe configuration is an SIB1 (system information block1) uplink/downlink subframe configuration if a detection of information on an uplink/downlink subframe configuration is not successful, and
wherein the specific uplink/downlink subframe configuration is a detected uplink/downlink subframe configuration if the detection of the information on the uplink/downlink subframe configuration is successful.

2. The method of claim 1, wherein the preset DRX related timer counts only in subframes matching locations of downlink subframes on SIB1 uplink/downlink subframe configuration previously configured through system information for the TDD primary cell or locations of special subframes including a downlink resource over a preset length.

3. The method of claim 1, wherein the user equipment is incapable of simultaneous transmission and reception in the TDD primary cell and the secondary cell.

4. The method of claim 1, wherein the SIB1 uplink/downlink subframe configuration having a maximum downlink subframe number is an uplink/downlink subframe configuration assigned to the user equipment.

5. A user equipment operating in DRX (discontinuous reception) mode for detecting a downlink control channel in a carrier aggregation applied wireless communication system, comprising:
a wireless communication module configured to transceive a signal with a network; and
a processor configured to process the signal,
wherein the processor is further configured to configure downlink control channel detection subframes in secondary cell based on a specific uplink/downlink subframe configuration for a TDD (time division duplex) primary cell, detect the downlink control channel from the downlink control channel detection subframes when a preset DRX related timer defined by a subframe number unit is operating, and control the wireless communication module to receive a downlink data channel based on the detected downlink control channel,
wherein the specific uplink/downlink subframe configuration is an SIB1 (system information block1) uplink/downlink subframe configuration if a detection of information on the uplink/downlink subframe configuration is not successful,
wherein the specific uplink/downlink subframe configuration is a detected uplink/downlink subframe configuration if the detection of the information on the uplink/downlink subframe configuration is successful,
wherein the downlink control channel detection subframes comprise subframes on the secondary cell matching locations of downlink subframes on the specific uplink/downlink subframe configuration or locations of special subframes including a downlink resource over a preset length.

6. The user equipment of claim 5, wherein the preset DRX related timer counts only in subframes matching locations of downlink subframes on the SIB1 uplink/downlink subframe configuration previously configured through system information for the TDD primary cell or locations of special subframes including a downlink resource over a preset length.

7. The user equipment of claim 5, wherein the user equipment is incapable of simultaneous transmission and reception in the TDD primary cell and the secondary cell.

8. The user equipment of claim 5, wherein the uplink/downlink subframe configuration having the maximum downlink subframe number is an uplink/downlink subframe configuration assigned for a downlink HARQ (hybrid automatic repeat and request) operation in the TDD primary cell.

* * * * *